Jan. 22, 1952     J. B. BINGHAM ET AL     2,582,945
FLOATING PICKUP WHEEL TYPE BEET HARVESTER
Filed July 26, 1947     6 Sheets-Sheet 3

*INVENTOR.*
JAMES B. BINGHAM
ORLANDO A. HOLKESVIG
BY THOROLF H. HERBERG

ATTORNEY

INVENTOR.
JAMES B. BINGHAM
ORLANDO A. HOLKESVIG
THOROLF H. HERBERG
BY
ATTORNEY

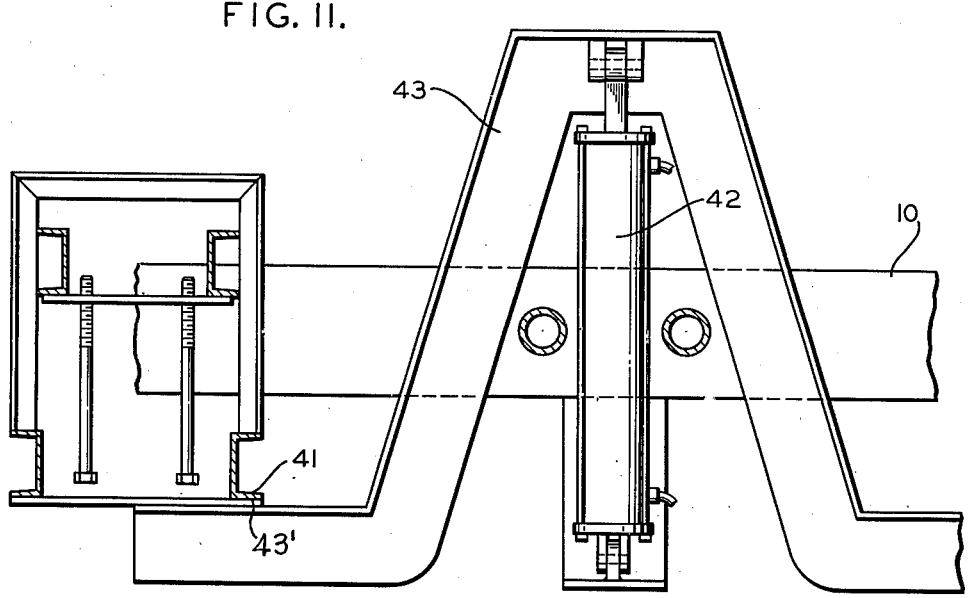
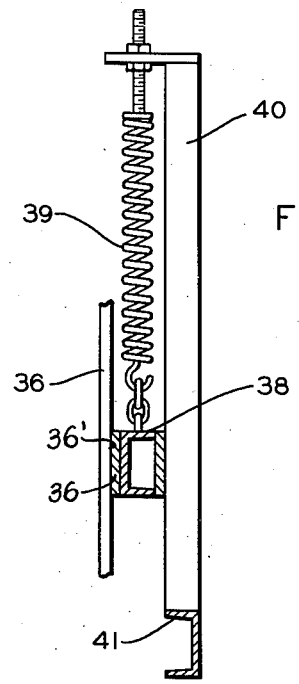

Patented Jan. 22, 1952

2,582,945

UNITED STATES PATENT OFFICE 2,582,945

FLOATING PICKUP WHEEL TYPE BEET HARVESTER

James B. Bingham, Orlando A. Holkesvig, and Thorolf H. Herberg, East Grand Forks, Minn.

Application July 26, 1947, Serial No. 763,952

8 Claims. (Cl. 55—108)

This invention relates to a beet harvester which includes a floating pickup wheel pivoted in the front of the frame and suspended by springs which give the pickup wheel a floating action. This takes any additional weight off of the beet as it is picked up and eliminates the breaking off of the tail of the beet or the cracking and crushing thereof. In this manner we provide a means of picking up the beet while it is in the natural growing position.

It is a feature to provide a floating frame for our beet harvester with the pickup wheel suspended in a floating position which permits the same to roll up on the beets that protrude above the ground and then roll down on lower beets to follow the contour of the ground as well as the crowns of the beets.

We provide springs on the sides of the frame positioned approximately in the center of the pickup wheel, one on each side, the tension of which can be adjusted to balance the weight of the wheel on the crown and to permit the adjustment of the weight of the same to apply additional pressure of the pickup wheel to the beets in the ground when it is desired.

A primary feature of our beet harvester resides in providing a means for picking up the beets which does not change the position of the beet in the ground by pushing it into the ground or disturbing it in any way but picking up the beet in its natural position and bringing it up on the spikes into topping positon.

It is also a feature to provide a rotary beet adjusting wheel to bring the beets up to the required height just before topping, which permits the adjustment of the topping of the beet in a manner to cut more or less of the crown from the body of the beet and which also acts as a cleaner between the rims of the beet pickup wheels.

It is a feature to provide adjustable self-cleaning skeleton pinions for supporting the floating rims of the pickup wheels. These self-cleaning skeleton pinions permit the pickup wheels to rotate freely and overcome any clogging of the dirt in pinions or wheels.

A further feature of our beet harvester resides in providing retarding arms which act to hold the beets in an upright position while entering and being topped by the rotary cutter knives. These retarding arms are provided with adjustable tension means to regulate the degree of pressure of the arms against the sides of the beets.

We also provide a means of adjustment so that the arms may be set in any position, either forward or backward, depending on the size of the beet and condition of the beet in relation to the cutting discs which top the same.

A further feature of our beet harvester resides in providing a lifter plow to loosen the root of the beet, which is so set in relation to the pickup wheel of the harvester that as the pickup wheel moves over the top of the beet, the beet will be loosened by the lifter plows and thereby remain impaled on the prongs of the pickup wheel. The plows are so constructed that the narrow rods curve downward and then flare outward at the point, and the lifting rods are attached to the shank which is adjustably supported to the frame of the harvester. This permits an adjustment forward and backward on the frame as soil conditions may dictate.

We also provide an adjustment where the plows can be moved inwardly or outwardly from the row. One plow operates on each side of the row to form a pair. The plows operate on either side of the beets to raise the roots of the same by loosening the tap root, which frees the beet and allows it to remain impaled on the prongs of the pickup wheel. The advantage of this type of lifter plow is that it is able to move under the surface of the ground with a minimum plowing effect, hence moves less of the soil than the conventional plow and requires less power to operate.

The foregoing features define the invention and will be supplemented with other features which will be described in detail together with the claims.

In the drawings forming part of this specification:

Figure 11 is an enlarged detail of the hydraulic cylinder and yoke for lifting the rear end of the floating frame which carries the pickup wheels.

Figure 12 is a diagrammatic detail looking toward the counterbalancing springs for the skeleton frame which supports a series of pinions for supporting the rim wheels.

The harvester A is provided with a longitudinal main frame 10 which is supported adjacent the rear end by the wheels 11. The front end of the frame 10 is adjustably supported to the bracket 12 by means of the depending bracket 12', the bracket 12 having holes formed therethrough adapted to align with the holes 12" and receive a pin therethrough which in turn is pivotally mounted at 13 to the steering wheel 14 which is turned by any suitable rod and lever connection well known in the art.

Figure 1:
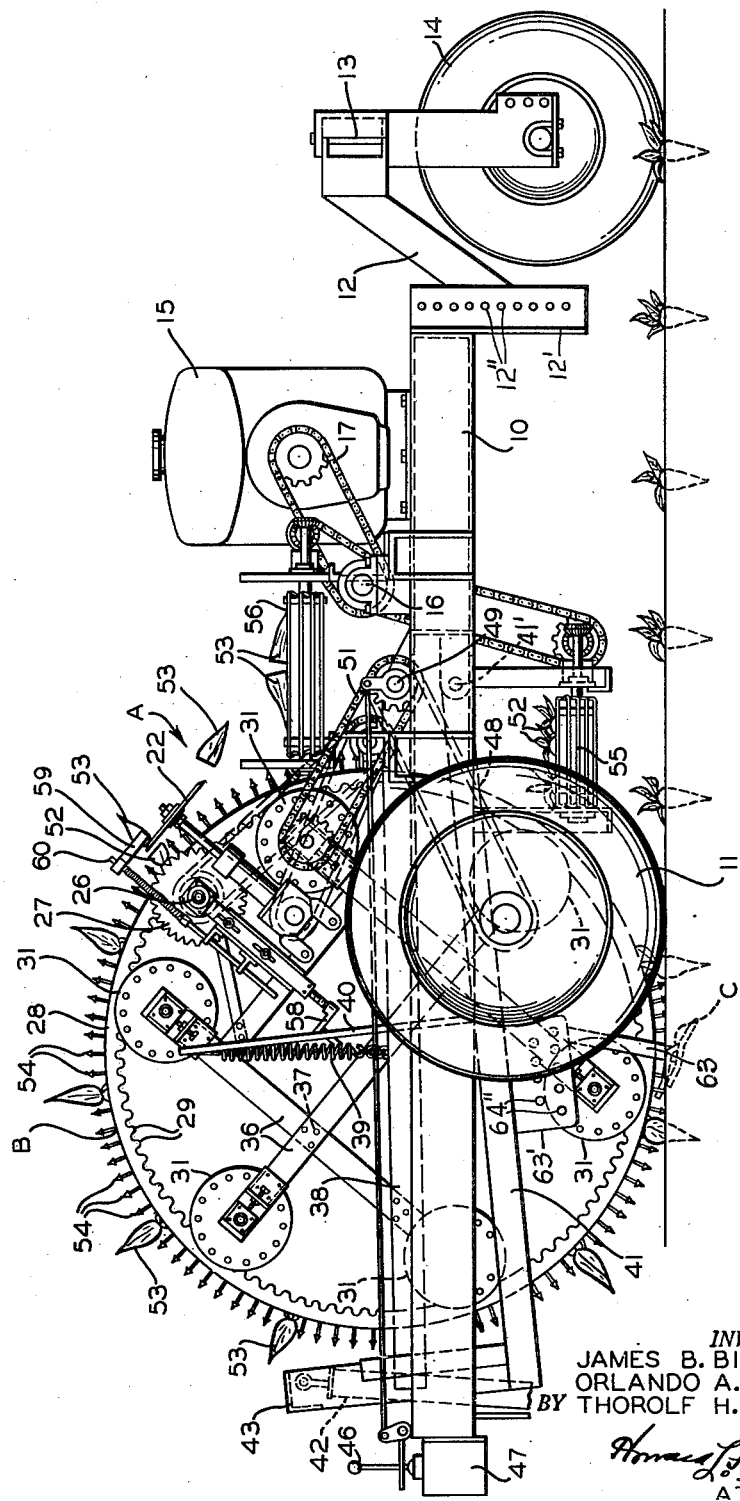
Figure 1 is a side view of our beet harvester.
Figure 2:
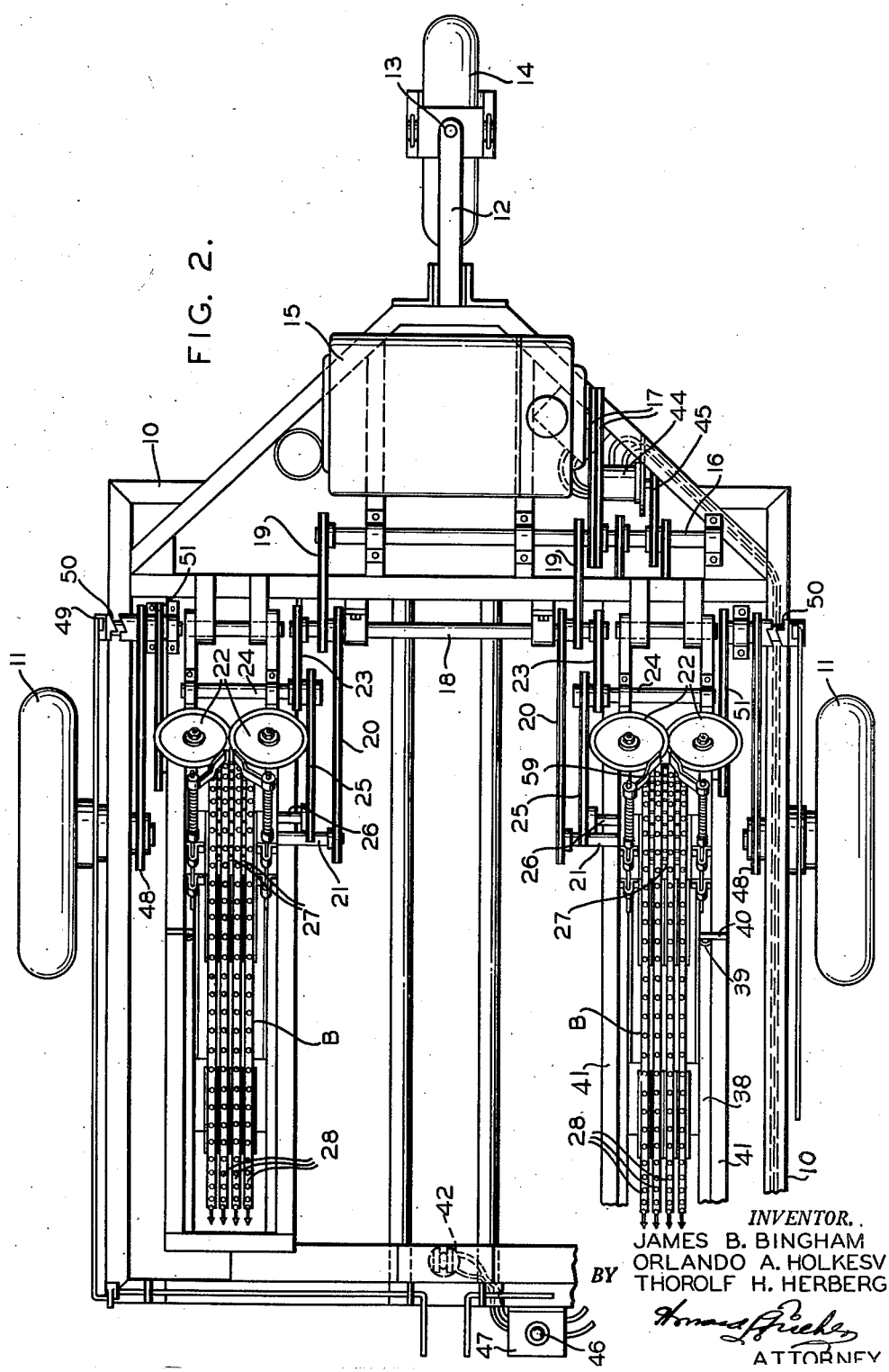
Figure 2 is a plan view looking down on our beet harvester.
Figure 3:
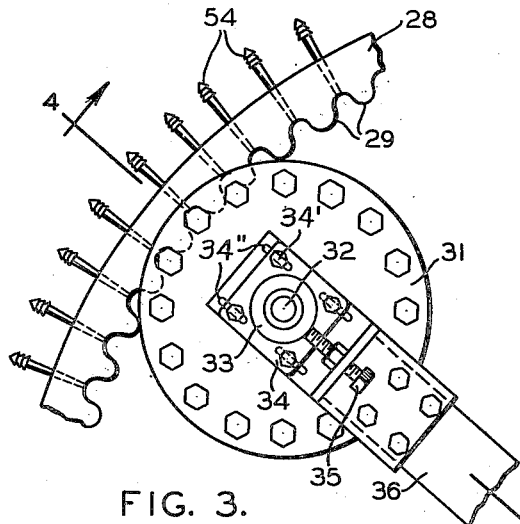
Figure 3 illustrates a detail showing a portion of the pickup wheel and the adjustable self-cleaning skeleton pinion for supporting the floating rims of the pickup wheels.

Upon the front end of the frame 10 we mount an engine 15 which is adapted to drive the shaft 16 through the drive chains 17 as illustrated in Figures 1 and 2. The shaft 16 is adapted to operate the drive shaft 18 by the chain drives 19. The shaft 18 is adapted to drive the chains 20 to propel the shaft 21 which operates the disc topper knives 22.

Figure 6:
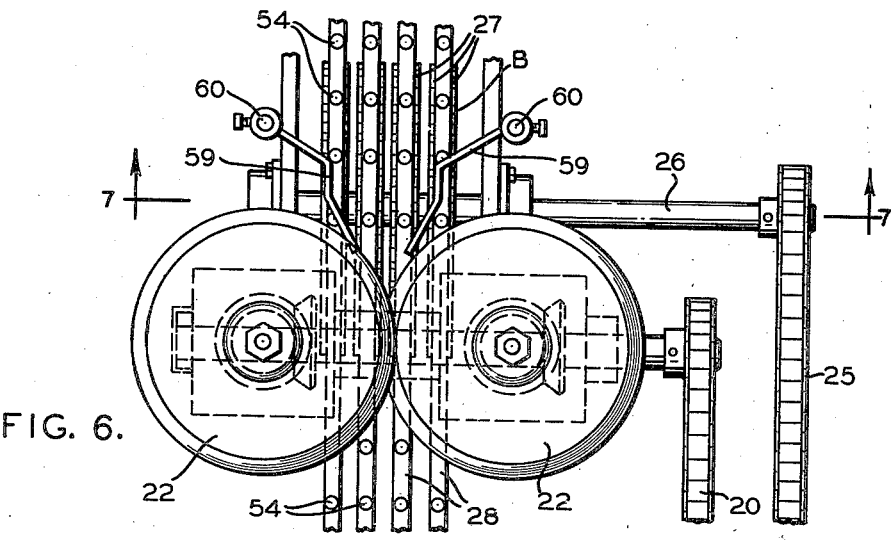
Figure 6 is a top view on the line 6—6 of Figure 5 in the direction of the arrows, showing the topping knives, beet retarding and holding arms, and a portion of the pickup wheels.
Figure 7:
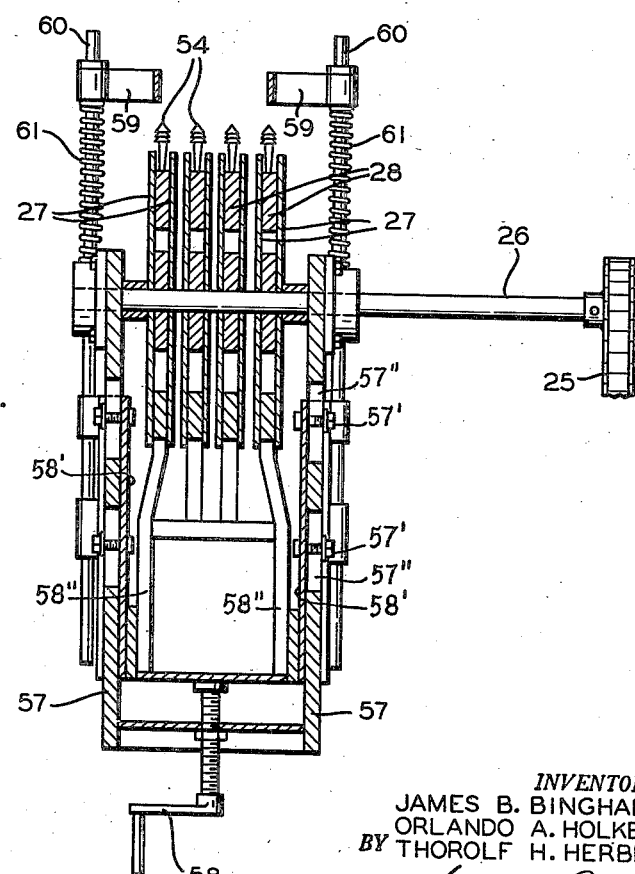
Figure 7 is a view on the line 7—7 of Figures 5 and 6 in the direction of the arrows.

The shaft 18 through the drive chains 23 propels the shafts 24 which in turn through the drive chains 25 propel the shafts 26. The shafts 26 are adapted to drive the rotary-toothed adjusting wheels 27 which operate on either side of each of the floating rim wheels 28, as more clearly illustrated in Figures 6 and 7.

The large floating rim wheels 28 are provided with internal teeth 29 which engage the rods 30 of the self-cleaning skeleton pinion units 31. The self-cleaning skeleton pinion units 31 are mounted upon the shafts 32 which are supported in the end bearings 33. The plates 34 which support the bearings 33 are adjusted by the screws 35 which adjust the self-cleaning skeleton pinions 31 on the bracket arms 36. The plates 34 are slideably connected to the arms 36 by means of the bolts 34' which are secured through the slots 34". The bracket arms 36 form a skeleton frame within the area of the floating wheel rims 28 and are secured to each other where they cross, such as at 37 (illustrated in Figure 1). The skeleton frame formed by the arms 36 is secured to the floating longitudinal side frame members 38 which are free to slide up and down against the standard 40. The frame members 38 are supported by the coil springs 39 on each side of the harvester, and the upper ends of the coil springs are supproted by the upright standard 40 which in turn is secured at its lower end to the adjustable frame 41. The frame members 38 are connected to the spring 39 while the spring 39 is connected to the upright 40 which in turn is secured to the frame 41 particularly shown in Figure 12. The frame 41 is adapted to be raised and lowered by the hydraulic cylinder 42 which is positioned within the yoke 43 which in turn supports the side frame members 41. The frame 41 is pivotally mounted at the forward end thereof to the frame 10 at 41' as shown in Figure 1 and the frame 41 is connected at the rear end to the yoke 43 as at 43'. When the hydraulic cylinder is operated by the oil pump 44, the frame members 41 may be raised or lowered. The pump 44 is operated by the chain 45 off of the shaft 16 (as illustrated in Figure 2). The control lever 46 for operating the hydraulic cylinder 42 is located at the back of the machine and is adapted to control the valves (not illustrated but contained within the housing 47).

Figure 4:
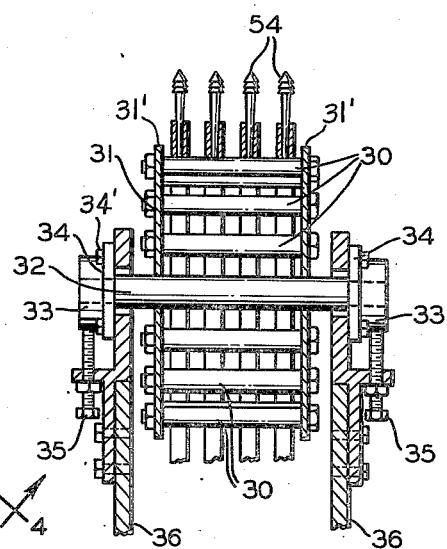
Figure 4 is a sectional detail on the line 4—4 of Figure 3 in the direction of the arrows.

The wheels 11 are adapted to drive the chains 48 (as illustrated in Figure 2) to drive the jack shafts 49. Clutches 50 (shown in Figure 2) connect the driving wheels 11 through the chain 48 in a manner to drive the chains 51 (shown in Figures 1 and 2) which operate the self-cleaning skeleton pinion unit 31 at a forward position in each of the floating pickup wheel units B. The pickup wheel units B are made up of a series of floating pickup wheels 28 (as illustrated in Figures 1 and 2). The floating pickup wheel rims 28 rotate on the series of self-cleaning skeleton pinion units 31 which are adjustably carried on the skeleton frame made up of the arms 36, as illustrated in Figure 1 where some of the units 31 are shown in dotted outline. The harvester illustrated in Figure 1 shows the floating pickup wheel rims 28 supported by six self-cleaning skeleton pinion units 31. The wheel rims 28 are guided and held in position by the side rims 31' of the pinions 31 as more particularly shown in Figure 4.

Figure 5:
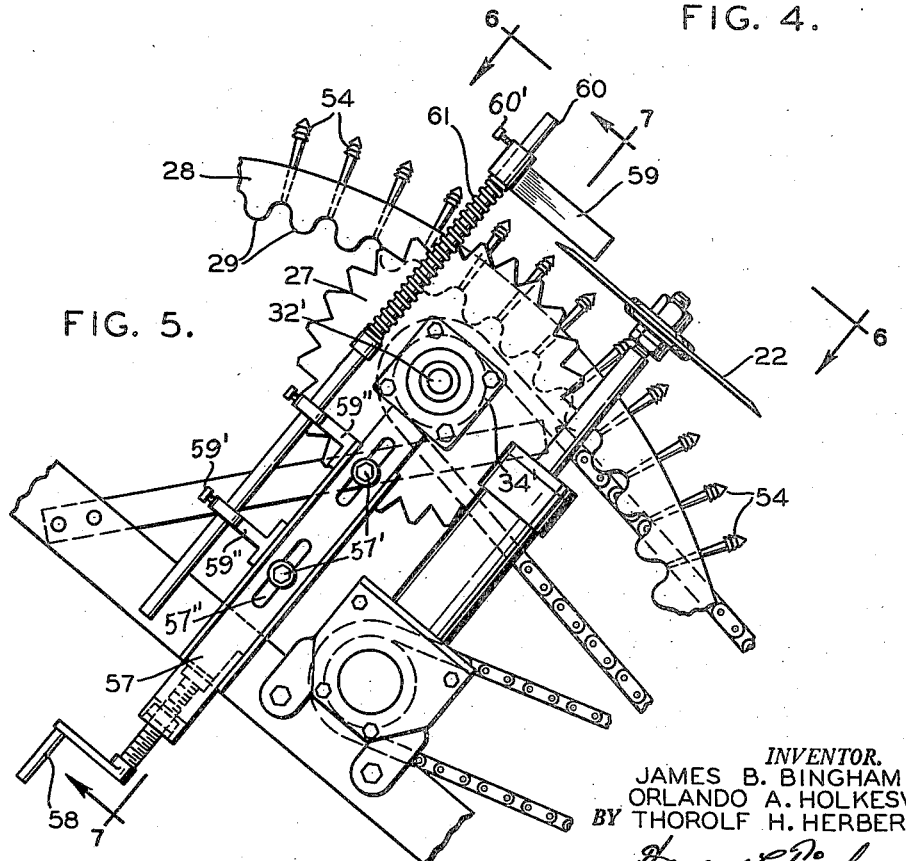
Figure 5 is a side detail of a portion of the floating rim with the pickup spikes, showing the topping knives, the rotary beet adjusting wheels, together with the beet retarding arms which act to hold the beets in an upright position while entering and being topped by the rotary cutter knives.

The disc topper knives 22 are rotated at a comparatively high speed and are adapted to sever the tops or crowns of the beets 52 from the root or body of the beet 53 (as illustrated in Figure 1) in the operation of the pickup units B. The floating wheel rims 28 of the pickup units B carry a series of spikes 54 which penetrate the crown (top of beet) and are adapted to hold the same from the time the beet is lifted out of the ground until it is topped by the knives 22 and the crown or head of the beet 52 is carried around to be discharged on the transverse carrier belt 55 which discharges the crowns 52 to one side of the harvester A. The spikes 54 are driven into slots formed in the rims 28 to secure the same. An upper transverse belt 56 collects the body 53 of the beet to carry the same to one side of the beet harvester A. The rotatable beet adjusting wheels 27 are supported by the bracket arms 57 which are adapted to be adjusted by the hand screw 58 to move the toothed rotary beet adjusting wheels 27 in a manner to adjust the beets on the spikes 54 just before they reach the topping knives 22 (as illustrated in Figures 1 and 5). The U-shaped bracket 58' supports the wheels 27 by means of the support 58", the bracket 58' being adjustably positioned by means of the bolts 57' secured to the bracket 58' through the slots 57".

These rotary beet adjusting wheels 27 act to adjust the beets on the spikes 54 and also to cleanse the floating wheel rims 28 of any dirt which may have been picked up by the wheels when the beets are lifted from the ground. Figure 1 illustrates the operation of our beet harvester A showing the manner in which it carries the beets from the ground up to the topping means and past the rotating adjusting wheels 27. We provide a series of adjusting wheels 27, one on each side of each of the wheel rims 28 as illustrated in Figures 4, 5, 6, and 7.

It will be apparent that an important function of our beet harvester is to maintain the beet pickup units B clean and free of any dirt or chunks of dirt which may have adhered to the pickup wheels in the operation of the harvester.

A further feature of our harvester resides in the retarding arms 59 which are adjustably supported on the upright rods 60 by means of the set screws 59' on the brackets 59" and which are urged by spring tension of the coil spring 61 carried on the rod 60 to hold the free ends of the arms 59 in contact with the body of the beet as it passes between the arms toward the topping knives 22. These arms 59 may be further adjusted by the set screw 60', either forward or backward, depending on the size of the beet and condition of the beet in relation to the cutting discs 22. The arms 59 act to hold the beets in an upright position while entering and being topped by the cutter knives 22.

Figure 8:
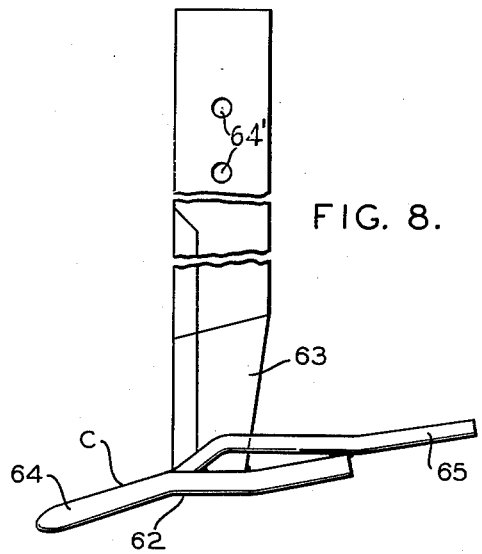
Figure 8 is a detail of our rod-like plows in side elevation.
Figure 9:
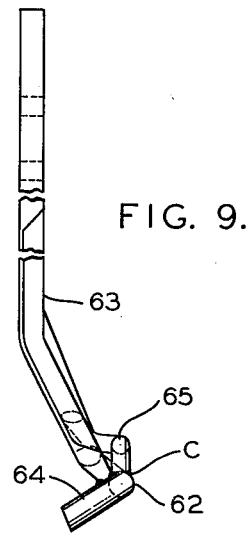
Figure 9 is a front view of Figure 8 showing the front end of the plow.
Figure 10:
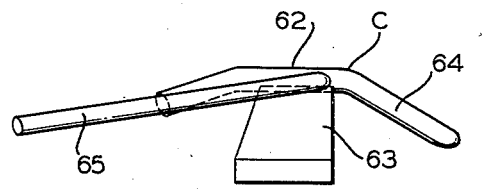
Figure 10 is a plan view looking down on one of the plows.

We provide a plow unit C (illustrated in Figures 8 to 10 inclusive). The plow unit C is made up of a longitudinally extending rod 62 which is supported on the depending bracket arms 63 which anchor the plow unit to the frame of the harvester. The bracket arms 63 are adjustably secured to the brackets 63' which in turn are secured to the frame 41. The holes 64' are adapted to align with any of the holes 64" of the brackets 63' and receive a pin to adjustably position said brackets 63. The plow arm 62 has a forward depending end 64 which is bent to extend down and outward from the rear portion of the arm 62 as illustrated in the front view (Figure 9). We provide a lifting rod 65 on each of the plow units C which is adapted to lift the beet after the plow rod 62 has loosened the dirt on either side of the root of the beet body 53 while the beet is still standing upright in the ground. The feature of our plow resides in a plow unit which operates on each side of the row of beets to form a pair of units C, and the plow rod 62 with its dirt breaking end 64 will loosen the dirt around the beet and permit it to be moved to the lifting rod 65 and then impaled on the prongs or spikes 54. As the harvester is operated a plow C is positioned on each side of the beet.

We claim:

1. A beet harvester including a main frame, an adjustable steering wheel secured to the forward end of said frame having means to adjust the height of the front end of said frame, rear wheels supporting said frame positioned on each side thereof, a pair of floating beet pickup rim units supported within said frame in a manner to pick up two rows of beets at a time, said pickup rim units including a series of parallelly disposed floating wheel rims each having a series of beet pickup spikes secured to said rims, inner frames pivotally connected to said main frame for each of said pickup units, hydraulic means for raising and lowering said inner pivoted frames, counterbalancing springs on either side of said pickup units secured to said pivoted frames for balancing the same to said inner supporting frames, a series of adjustable rotary pinions supported by a skeleton frame connected to said counterbalancing springs, and an internal gear formed on each of said wheel rims adapted to engage said pinions to rotatably support said wheel rims on said pinions to pick up beets while standing in growing position in the ground when the earth about the beets has been loosened.

2. A beet harvester including a main supporting frame, an inner frame pivoted to said main frame, a floating beet pickup unit comprising a series of parallelly disposed floating wheel rims, an internal gear formed on each of said rims, a series of adjustable pinions adapted to engage said gears of said wheel rims, a skeleton frame on which said pinions are mounted, counterbalancing spring means connecting said inner frame to said skeleton frame, topping knives for topping the beets picked up by said wheel rims, said topping knives being adjustably secured to said skeleton frame, and an adjustable wheel cleaning unit secured to said skeleton frame and formed of a series of rotating toothed wheels which extend between said wheel rims in a manner to cleanse the same in operation and to adjust the position of the beet on said wheel rims just prior to being topped.

3. A beet harvester including a main outer frame, one or more beet pickup wheel units, means for floatingly supporting said units to said main frame, means for raising and lowering said units within said frame, self-cleansing means for said units to free the same of any dirt in the operation of said harvester, said pick-up wheel units including a series of floating wheel rims having internal gears formed thereon, pinions for supporting said wheel rims, a skeleton frame on which said pinions are mounted, an inner frame pivoted to said main frame, counterbalancing means connecting said skeleton frame to said inner pivoted frame, said self-cleaning means for said rims secured to said skeleton frame extending on either side of said rims, and topping means secured to said skeleton frame adjacent said self-cleaning means for said beet pickup unit whereby said self-cleaning means may be adjusted in relation to said wheel rims to position the beet picked up by said unit just prior to topping the same.

4. A beet harvester comprising a main cutter frame, a series of one or more beet pickup units each including a series of floating wheel rims, internal gears formed on said rims, pinions engaging said internal gears to support said wheel rims in parallel relation to each other, a skeleton frame unit for supporting said pinions, springs for supporting said skeleton frame unit to said main frame of said harvester, drive wheels secured to the main frame of said harvester, means for driving said pickup units by said drive wheels through one of said pinions, a series of shouldered spikes secured to the rims of the wheels of said pickup units, adjustable spring arms secured to said skeleton frame for engaging the sides of a beet picked up by said unit to support the beet while being topped, rotary topping knives, means for securing said topping knives adjacent said spring arms, rotary beet positioning wheels rotatably mounted on said skeleton frame adapted to extend between said wheel rims, means for adjusting said rotary beet positioning wheels, said beet positioning wheels acting to position the beet before topping and to automatically cleanse the wheel rims of said pickup units of any dirt which may adhere thereto while picking up beets.

5. A beet harvester including a frame, wheels for supporting said frame, an engine mounted on the forward end of said frame, an upper transverse endless belt and lower transverse endless belt supported by said frame, means for driving said belts from the power of said engine, one or more beet pickup units floatingly and adjustably supported in said frame, said pickup units comprising a series of parallelly disposed floating spokeless wheel rims, internal gear means formed on said rims, a series of spaced apart supporting pinions for said wheel rims, a frame member for supporting said pinions, means secured to said frame member for adjusting said pinions, beet pickup spikes secured to said wheel rims, said spikes having retarding shoulders formed thereon for holding the beets from slipping off of said spikes, rotary topping knives adjustably secured to said frame member and adapted to be driven by said engine, rotary toothed cleaning wheels mounted on said frame member extending between and over the sides of said wheel rims to cleanse the same of dirt, means for driving said cleaning wheels by said engine, means for adjusting said cleaning wheels to space the beets before topping the same, adjustable spring arms secured to said frame member for holding the beet while it is being topped, means for driving said wheel rims by the drive wheels supporting said frame of said harvester, and clutch means for releasing said drive wheels from said beet pickup units.

6. A beet harvester including a frame, wheels for supporting said frame, some of said wheels acting as drive wheels, one or more floating beet pickup units, means for supporting said units pivotally within and to said frame, spring means secured to said support means for cushionally supporting said units, each of said units including a series of floating wheel rims, a series of adjustable pinions for supporting said wheel rims, a skeleton frame member for supporting said pinions secured to said supporting means, internal gear means formed on said wheel rims for supporting the same on said pinions, beet pickup spikes secured to said wheel rims, horn-like ground loosening plows adjustably secured to said frame adapted to free the earth around the beet in the ground without disturbing the upright position thereof to permit said spikes to pick up the beet by penetrating the crown thereof, said beet pickup units being driven by means connected to the wheels of said harvester, a pair of disc cutter knives for each of said units secured to said skeleton frame, a rotary automatic rim cleansing unit secured to said skeleton frame, a beet carrier belt and a crown carrier belt supported on said frame, and a power engine adapted to operate said cutter knives, cleansing unit and carrier belts in a manner so that said pickup units of said harvester are adapted to floatingly roll over the crowns of the loosened beets and to carry the same to the topping knives where the root is carried to one of said carriers and the crown to the other of said carriers, which discharge the respective parts of the beet to either side of the harvester.

7. A beet harvester comprising a main supporting frame, floating beet pickup wheels, a skeleton frame on which said pickup wheels are mounted, an adjustable frame pivotally secured to said main frame, a movable frame, means connecting said skeleton frame to said movable frame, counterbalancing means connecting said movable frame to said adjustable frame, spikes secured to said pickup wheels on which the beets are impaled when lifted from the ground, rod-like plows secured to said adjustable frame on each side of said pickup wheels adapted to loosen the ground on each side of the beet before it is impaled by said pickup wheel spikes, shaft means secured to said skeleton frame adjacent said beet pickup wheels, topping knives secured to said shaft means for removing the crowns of the beets, spring retarding and holding arms secured to skeleton frame adapted to support the beets while being topped, and rotary cleaner wheel means adjustably secured to said skeleton frame to provide beet adjusting means and beet pickup wheel cleaning means.

8. A beet harvester including a main supporting frame, a pair of transversely extending endless belts supported by said frame, an engine for driving said belts, said belts being positioned one above the other, the uppermost belt being adapted to receive the beet roots when topped and the lower belt being adapted to receive the crown of the beet after it has been severed from the root, a series of floating beet pickup wheel rim units adapted to pick up one or more rows of beets, said pickup units comprising a series of floating spokeless wheel rims, a series of pinions engageable with and supporting said wheel rims, a skeleton frame for adjustably supporting said pinions against said wheel rims, a frame pivotally secured to said main frame, spring means connecting said pivoted frame to said skeleton frame, means for driving at least one of said pinions by the wheels of said harvester to rotate said pickup unit, a series of beet pickup spikes secured to said rims, topping means secured to said skeleton frame adjacent said wheel rims and adapted to be driven by said engine for severing the crown from the root of the beet, and plow means adjustably secured to said main frame including inclined rod-like horn members adapted to gore the ground on either side of the beets to loosen the ground around the beets without disturbing the upright growing position thereof and permit the pickup units to engage the beet and carry it around to said topping knives and deposit the topped root onto said upper endless belt and the crown onto said lower endless belt.

JAMES B. BINGHAM.
ORLANDO A. HOLKESVIG.
THOROLF H. HERBERG.

REFERENCES CITED

The following references are of record in the file of this patent:

UNITED STATES PATENTS

| Number | Name | Date |
| --- | --- | --- |
| 1,272,604 | Beale | July 16, 1918 |
| 1,300,362 | Faucher | Apr. 15, 1919 |
| 1,317,927 | Lint | Oct. 7, 1919 |
| 1,503,625 | Beale | Aug. 5, 1924 |
| 1,504,484 | Knowles | Aug. 12, 1924 |
| 2,350,173 | Loucks | May 30, 1944 |
| 2,429,743 | Bingham | Oct. 28, 1947 |